US012751373B2

(12) United States Patent
Duquesne et al.

(10) Patent No.: US 12,751,373 B2

(45) Date of Patent: Oct. 6, 2026

(54) FEED ROLL DRIVE FOR AGRICULTURAL HARVESTER THRESHER

(71) Applicant: CNH Industrial Belgium N.V., Zedelgem (BE)

(72) Inventors: Frank R. G. Duquesne, Zwevegem (BE); Tom A. De Lathauwer, Lede (BE); Sam Reubens, Sint-Michiels (BE)

(73) Assignee: CNH Industrial Belgium N.V. (BE)

(*) Notice: Subject to any disclaimer, the term of this patent is extended or adjusted under 35 U.S.C. 154(b) by 416 days.

(21) Appl. No.: 18/508,958

(22) Filed: Nov. 14, 2023

(65) Prior Publication Data

US 2025/0151663 A1 May 15, 2025

(51) Int. Cl.

*A01F 12/56* (2006.01)
*A01F 7/06* (2006.01)
*A01F 12/12* (2006.01)

(52) U.S. Cl.

CPC ................ *A01F 12/56* (2013.01); *A01F 7/06* (2013.01); *A01F 12/12* (2013.01)

(58) Field of Classification Search

CPC .. A01F 12/56; A01F 7/06; A01F 12/12; A01F 12/10; A01D 69/06

See application file for complete search history.

(56) References Cited

U.S. PATENT DOCUMENTS 3,643,720 A 2/1972 Sadler et al.
4,739,773 A * 4/1988 West ..................... A01F 12/442 460/80
6,984,171 B2 * 1/2006 Brome ................... B60K 17/28 460/59
7,140,961 B2 * 11/2006 Visagie .................. A01D 41/02 460/119
8,781,694 B1 * 7/2014 Sheidler ............. A01D 41/1274 56/11.1
11,950,528 B2 * 4/2024 Van De Wege ......... A01F 12/40
2015/0201560 A1 * 7/2015 Demirdzhi ........... A01D 69/005 460/116
2016/0302361 A1 * 10/2016 Bojsen .................... A01F 12/56
2017/0086365 A1 * 3/2017 Gonzalez-Mohino ....................... A01D 41/142

(Continued)

FOREIGN PATENT DOCUMENTS

CA 2530169 C * 4/2009 ........... A01D 69/005
CN 202276663 U 6/2012

(Continued)

OTHER PUBLICATIONS

The Extended European Search Report issued Mar. 17, 2025, by the European Patent Office in corresponding European Patent Application No. 24213026.8 (8 pages).

(Continued)

*Primary Examiner* — Arpad Fabian-Kovacs

(74) *Attorney, Agent, or Firm* — Buchanan Ingersoll & Rooney PC

(57) ABSTRACT

A threshing apparatus for an agricultural harvester has an axial threshing rotor driven by a power unit from its rearward end. The axial threshing rotor is connected at its forward end to a dynamic feed roll through a drive train including a drive connected to the axial threshing rotor and having an output shaft extending to a side of the dynamic feed roll where it is connected by either a gear set or a pulley drive.

11 Claims, 4 Drawing Sheets

(56) References Cited

U.S. PATENT DOCUMENTS

| | | | | |
|---|---|---|---|---|
| 2017/0094906 | A1* | 4/2017 | Bomleny | A01D 41/127 |
| 2018/0092303 | A1* | 4/2018 | Goering | A01D 69/025 |
| 2022/0346320 | A1 | 11/2022 | Solimar Walter | |

FOREIGN PATENT DOCUMENTS

| | | | | | |
|---|---|---|---|---|---|
| CN | 202759826 | U | | 3/2013 | |
| CN | 202889999 | U | | 4/2013 | |
| CN | 203748256 | U | | 8/2014 | |
| CN | 104904416 | A | | 9/2015 | |
| CN | 111226610 | A | * | 6/2020 | A01F 12/56 |
| CN | 116724763 | A | * | 9/2023 | A01F 7/02 |
| DE | 102011017618 | A1 | | 10/2012 | |
| EA | 018822 | B1 | * | 10/2013 | A01D 41/1274 |
| EP | 0124628 | A1 | * | 11/1984 | A01F 7/06 |
| EP | 2382857 | A2 | * | 11/2011 | A01F 12/56 |
| EP | 4305947 | A1 | * | 1/2024 | A01D 75/187 |
| GB | 1297988 | A | * | 11/1972 | A01F 11/06 |
| GB | 2057843 | A | | 4/1981 | |
| JP | 2022012790 | A | | 1/2022 | |
| WO | 02/074063 | A1 | | 9/2002 | |
| WO | 2014/141792 | A1 | | 9/2014 | |

OTHER PUBLICATIONS

Extended European Search Report for Belgian Application No. BE2016/5053 dated Sep. 26, 2016 (10 pages).

* cited by examiner

FEED ROLL DRIVE FOR AGRICULTURAL HARVESTER THRESHER

FIELD OF THE INVENTION

The present invention relates to agricultural harvesters such as combines, and, more particularly, to feed rolls incorporated in the harvester crop processing section.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and is transported to a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material, such as straw, from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve or sieve assembly) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve or sieve assembly are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine.

On certain advanced agricultural harvesters, a dynamic feed roll is positioned between a conveyor from the header and the threshing rotor so as to provide an arrangement where rocks that may be have been swept up in the harvesting process are dropped below to a container for removal without passing through the threshing rotor and the remainder of the processing apparatus. Typically, the dynamic feed roll has a series of projections that propel the harvested crop below the roll and through a chute into the inlet end of the threshing rotor. The projections also knock out rocks or other hard objects from the crop stream. There is a gap between the conveying apparatus and the chute for the dynamic feed roll through which the rocks may drop. In order to maintain efficient processing of the harvested crop through the threshing rotor, it is necessary to match the feed at the dynamic feed roll closely to the expected capacity of the threshing rotor. In an effort to provide flexibility in addressing differing operating conditions, the threshing rotor may be driven at one of a selected rotational speed by a gear box or drive train connected to the agricultural harvester power unit. As a result of this variation, the drive for the dynamic feed roll, which also is driven from the power unit, must have some type of variable speed drive train. Such a requirement requires a balance between complexity and cost of the system and the need to synchronize the dynamic feed roll with the processing requirement of the threshing rotor.

Accordingly, what is needed in the art is a simplified system for synchronizing the rotation of a dynamic feed roll with a threshing rotor in an agricultural harvester.

SUMMARY OF THE INVENTION

The present invention seeks to simplify the synchronizing of the rotational rate between the dynamic feed roll and the threshing rotor of an agricultural harvester.

The invention, in one form, is a threshing apparatus including a conveyor for transferring harvested crop in a given direction. At least one threshing rotor receives harvested crop and is driven for rotation about an axis parallel to the direction of the harvested crop for separating grain material. A dynamic feed roll is interposed between the conveyor and the threshing rotor and is rotatable about an axis at a right angle to the axis of rotation of the threshing rotor to control the feed of harvested crop from the conveyor to the threshing rotor. A drive train is connected to and driven by the threshing rotor and includes a right angle drive connected to the at least one threshing rotor and provides a shaft parallel to the axis of rotation of the dynamic feed roll extending to one end thereof and a mechanical connection between the shaft the dynamic feed roll so that the dynamic feed roll is driven in synchronism with the rotation of the threshing rotor.

An advantage of the present invention is a robust synchronism between the dynamic feed roll and the threshing rotor but in a direct and effective way.

Another advantage is the elimination of a separate gear box for the dynamic feed roll and still achieve synchronism.

Another advantage is the improved feeding of crop to the threshing rotor.

Another advantage is the improved removal of rocks from the crop stream.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
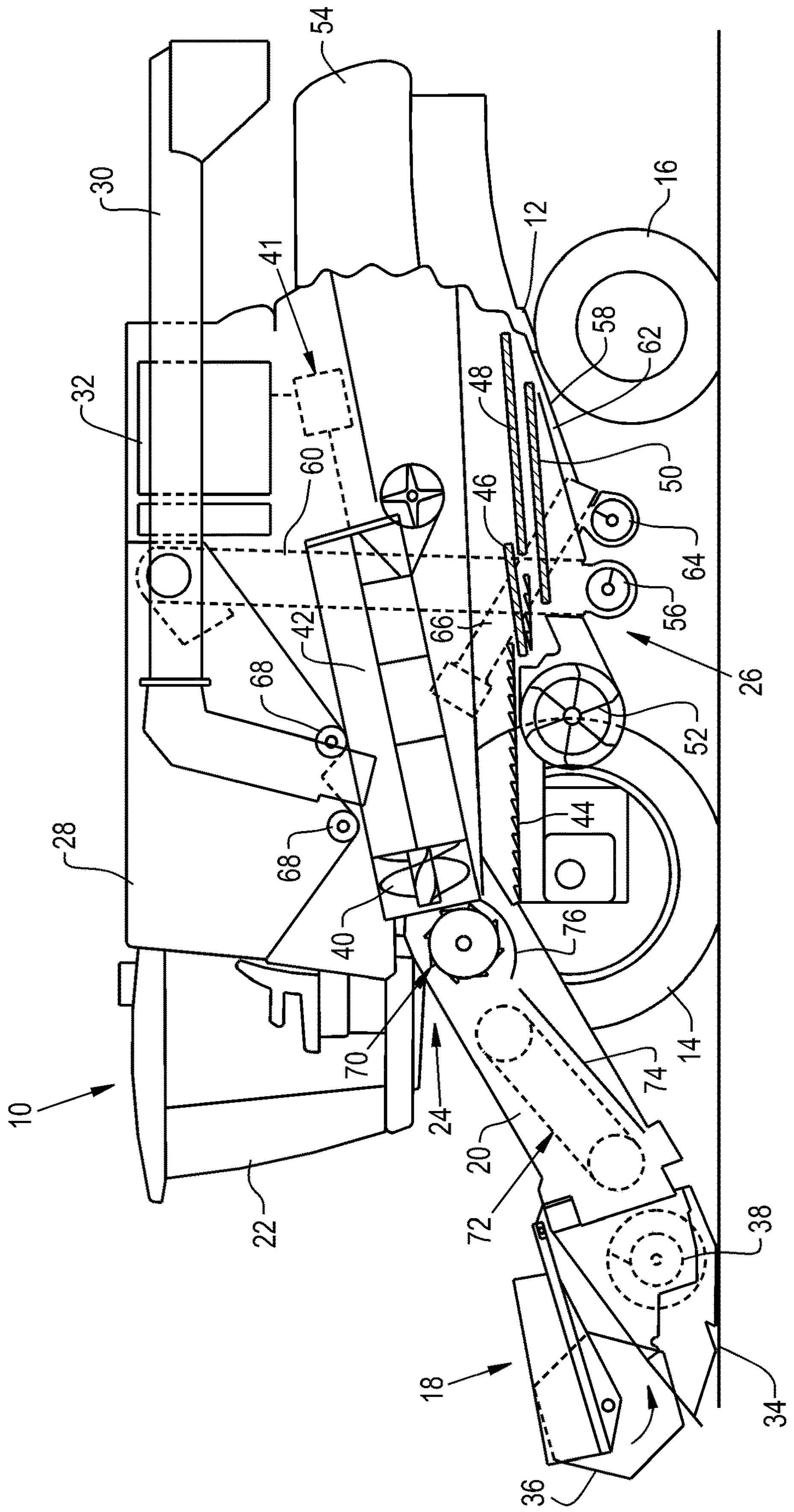
FIG. 1 is a side view of an embodiment of an agricultural harvester in the form of a combine which may include a dynamic feed roll apparatus embodying the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power unit in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. Threshing rotor 40 is driven in rotation by a drive train illustrated schematically at 41 that is connected to power unit 32. Drive train 41 receives a rotational input from power unit 32 and is coupled to the rearward end of rotor 40. Drive train 41 may have a variable rpm output capability to efficiently match crop conditions. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve or sieve assembly), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

In order to provide an efficient flow of crop material to the threshing rotor 40, a feed roll 70 is provided. The feed roll receives material from a conveyor 72 positioned within feed housing 20 for moving material along a conveyor floor 76. In the here illustrated embodiment, the feed roll 70 is a dynamic feed roll 70, which in addition to its crop conveying function also helps to remove rocks from the crop stream. The projections 71 knock out rocks from the crop stream. In order to knock out the rocks, the feed roll 70 should move the projections 71 on its outer surface with at least the same speed, and preferably at a somewhat higher speed, as the moving crop in the crop stream. If not, rocks in the crop stream can pass by the feed roll, get into the threshing system and cause damage. Therefor, it is an advantage that when the threshing rotor is rotating, the feed roll is also rotating, so that feed roll and threshing rotor are rotating in synchronism. A gap exists between conveyor floor 74 and a dynamic feed roll floor 76 so as to permit rocks that may have entered the crop material stream to be dropped out of the stream for appropriate disposal. When the feed roll is rotating in synchronism with the threshing rotor, the chances of the crop stream getting interrupted by clogging are also reduced. Dynamic feed roll 70, in accordance with the present invention, is driven directly from threshing rotor 40 as shown in FIGS. 2-4.

Figure 2:
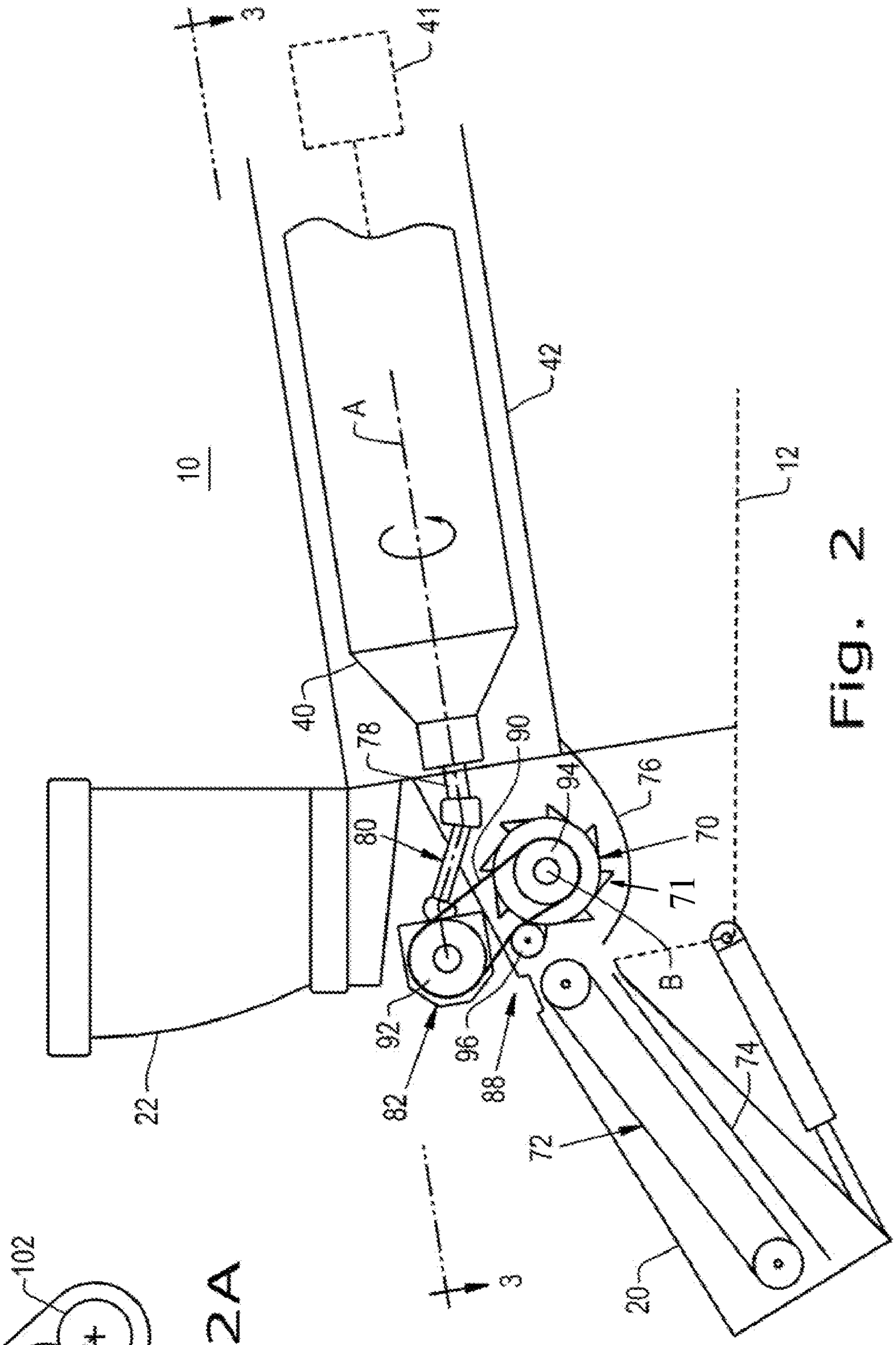
FIG. 2 is a partial side view of the agricultural harvester shown in FIG. 1 showing one embodiment of the present invention.
Figure 3:
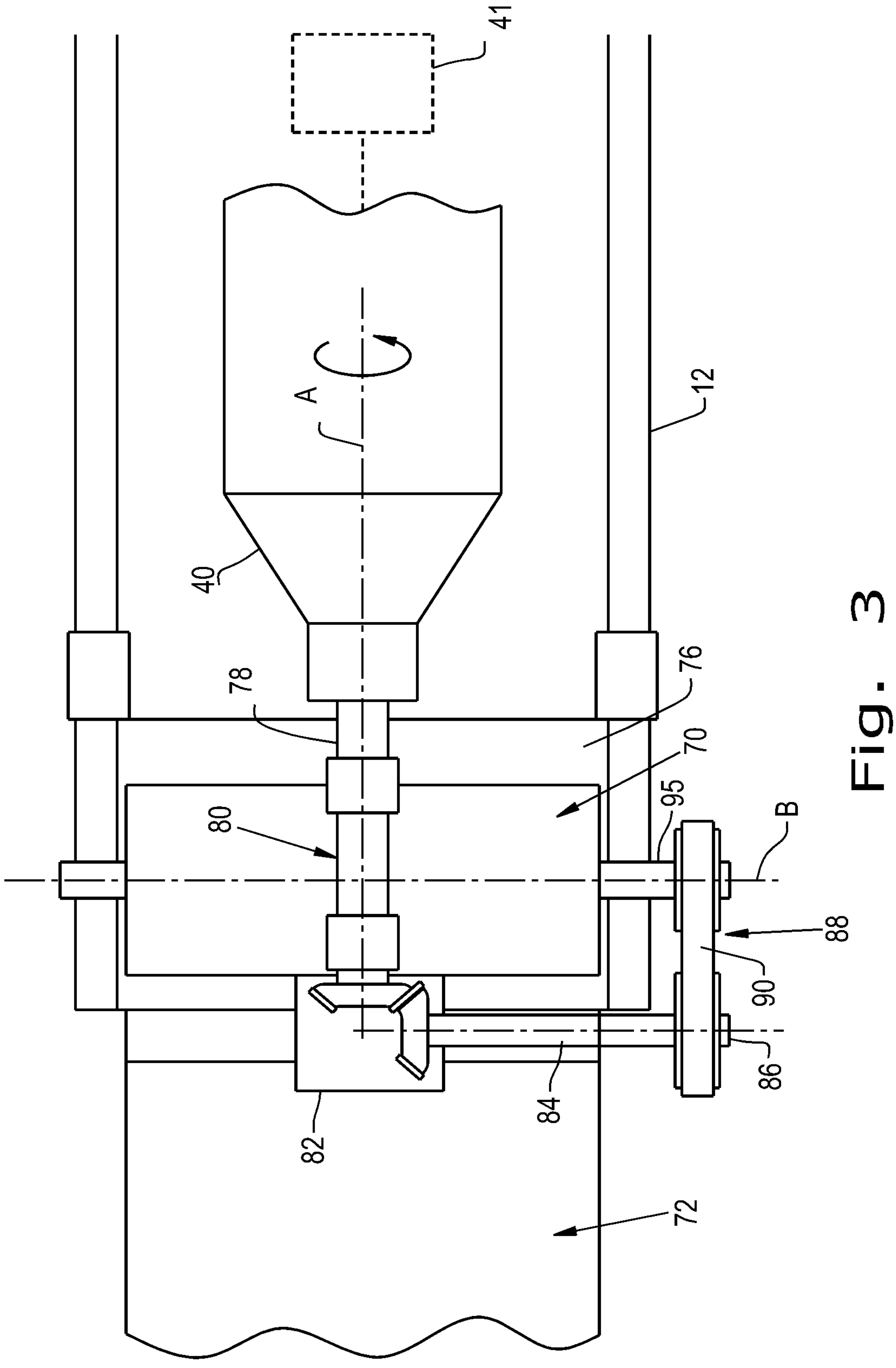
FIG. 3 is a top view of the one embodiment of the present invention of FIG. 2 taken on line 3-3 of FIG. 2; and, FIG. 4 is a partial perspective view of another embodiment of the present invention.

Referring particularly to FIGS. 2 and 3, a shaft 78 is supported by and is integral with dynamic feed roll 70. Although bearing assemblies for supporting the threshing rotor 40 and other elements are not shown to simplify the understanding of the present invention, it should be apparent to those skilled in the art that appropriate bearing assemblies may be employed to guide the components, including the threshing rotor, into rotation and fix them in an axial position. The threshing rotor 40 rotates about an axis A that is generally parallel to the direction of movement of crop material. At the same time, the dynamic feed roll 70 rotates about an axis B that is at a right angle to axis A. Shaft 78 is coupled to a universal joint 80 that extends to a right angle gear box 82 positioned at an elevation above the axis A of threshing rotor 40. Right angle gear box 82 may include bevel gears or any other form of gearing that converts the rotational axis through 90°. An output shaft 84 is connected to right angle gear box 82 and extends to an end 86 that is beyond the end of dynamic feed roll 70, particularly illustrated in FIG. 3. As shown in FIGS. 2 and 3, the output of shaft 86 is connected to dynamic feed roll 70 by a mechanical connection 88 including an input pulley 92 connected to shaft 84 and an output pulley 94 connected to a shaft 95 that supports dynamic feed roll 70. A belt 90 extends over pulleys 92 and 94 and an idler pulley 96 maintains appropriate belt tension for the torque requirements of the dynamic feed roll 70.

Figure 2A:
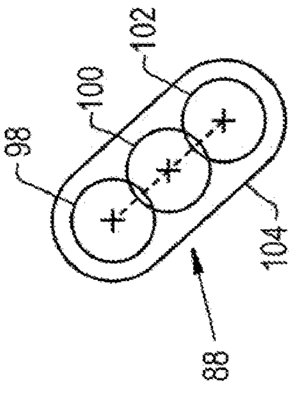

FIG. 2A illustrates an alternative mechanical connection 88 between shaft 84 and shaft 95. This mechanical connection 88 includes an input gear 98 coupled to shaft 84 and meshing with an intermediate gear 100 which in turn meshes with an output gear 102 connected to shaft 95. With both mechanical connections 88, the rotational axis is moved at right angles to itself to permit optimum positioning of the dynamic feed roll relative to threshing rotor to position crop material at the optimum position to enable precision and efficient processing to remove grain.

Figure 4:
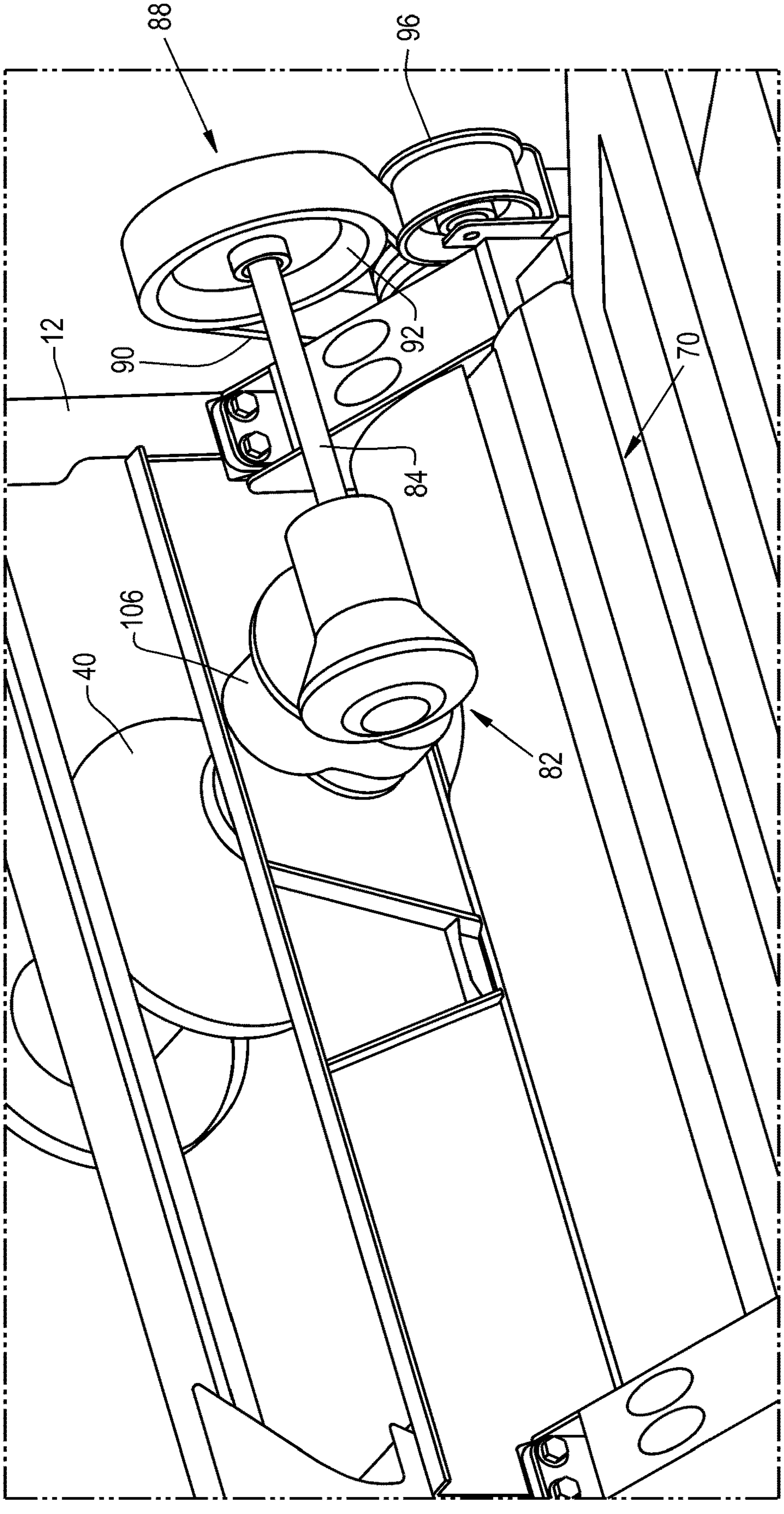

FIG. 4 shows an alternate arrangement to the universal joint shaft 80 connecting the threshing rotor 40 to the right angle gearbox 82. In this embodiment, a gear set 106 is positioned having the threshing rotor 40 as an input and the right angle gear box 82 as an output on an input axis that is displaced from the axis A of threshing rotor 42. The gear set would have an input gear connected to threshing rotor 40, meshing with an intermediate gear, which in turn, meshes with an output gear connected to right angle gearbox 82. This embodiment allows a closer coupling of the dynamic feed roll 70 relative to the input of the threshing rotor 40. FIG. 4 also illustrates a pair of threshing rotors 40, one of which drives the dynamic feed roll. One of the threshing rotors 40, not necessarily the one driving the dynamic feed roll, is driven by the drive train 41.

In both instances, the dynamic feed roll 70 is directly driven from the inlet end of the threshing rotor 40 and as such is in complete synchronism with the rotational speed of threshing rotor 40, regardless of what speed range is selected by the threshing rotor power train 41. By coupling the dynamic feed roll 70 and the threshing rotor 40 in this manner, the overall construction is simplified and the unit is able to be more flexibly incorporated in different agricultural harvesters.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A threshing apparatus comprising:

a conveyor that transfers harvested crop in a direction;

at least one threshing rotor that receives harvested crop from the conveyor for separating grain material, the at least one threshing rotor driven for rotation about an axis;

a feed roll interposed between the conveyor and the at least one threshing rotor, the feed roll rotates about an axis at a right angle to the axis of rotation of the threshing rotor, the feed roll comprising a plurality of projections that feed the harvested crop from the conveyor to the at least one threshing rotor and, wherein the projections of the feed roll move at a higher speed than the harvested crop to knock out stones from the harvested crop; and a drive train connected to and driven by the threshing rotor, the drive train comprising:

a first drive shaft coupled to the at least one threshing rotor that is rotated by the threshing rotor, a second drive shaft parallel to the axis of rotation of the feed roll and coupled to the feed roll for rotating the feed roll; and a mechanical connection between the first drive shaft and the second drive shaft so that the feed roll is driven in synchronism with the rotation of the at least one threshing rotor.

2. The threshing apparatus as claimed in claim 1, wherein the at least one threshing rotor is driven from its rearward end and the drive train is connected to a front of the at least one threshing rotor.

3. The threshing apparatus as claimed in claim 1, wherein the at least one threshing rotor is a pair of threshing rotors, one rotor of which is connected to the drive train to drive the feed roll.

4. The threshing apparatus as claimed in claim 1, wherein the mechanical connection comprises a pair of pulleys respectively connected to an end of the first drive shaft and the second drive shaft and a belt extending over and interconnecting the pulleys.

5. The threshing apparatus as claimed in claim 1, wherein the mechanical connection comprises a gear set between an end of the first drive shaft and the second drive shaft.

6. An agricultural harvester comprising:

the threshing apparatus of claim 1;

a frame;

a conveyor that moves the harvested crop toward the threshing apparatus, wherein the conveyor delivers the harvested crop at a speed that is slower than the speed at which the projections are moved; and a power unit;

wherein the at least one threshing rotor is driven from the power unit.

7. The threshing apparatus as claimed in claim 1, wherein the first and second drive shafts are arranged parallel to one another.

8. The threshing apparatus as claimed in claim 1, wherein the mechanical connection between the first drive shaft and the second drive shaft comprises a belt, and a mechanical connection between the first drive shaft and the threshing rotor is a gear set.

9. A threshing apparatus comprising:

a conveyor that transfers harvested crop in a direction;

at least one threshing rotor that receives harvested crop from the conveyor for separating grain material, the at least one threshing rotor driven for rotation about an axis;

a feed roll interposed between the conveyor and the at least one threshing rotor, the feed roll rotates about an axis at a right angle to the axis of rotation of the threshing rotor, the feed roll comprising a plurality of projections that feed the harvested crop from the conveyor to the at least one threshing rotor and to knock out stones from the harvested crop; and a drive train connected to and driven by the threshing rotor, the drive train comprising:

a first drive shaft coupled to the at least one threshing rotor that is rotated by the threshing rotor, a second drive shaft parallel to the axis of rotation of the feed roll and coupled to the feed roll for rotating the feed roll; and a mechanical connection between the first drive shaft and the second drive shaft so that the feed roll is driven in synchronism with the rotation of the at least one threshing rotor, wherein the first drive shaft is positioned above the axis of the at least one threshing rotor and is coupled to the at least one threshing rotor through a universal joint that extends obliquely to the axis of the threshing rotor.

10. The threshing apparatus as claimed in claim 9, wherein an input end of the universal joint is connected to the threshing rotor to be driven by the threshing rotor.

11. The threshing apparatus as claimed in claim 10, wherein an output end of the universal joint is connected to an input gear of a gearbox, the first draft shaft is connected to an output gear of the gearbox, a pair of pulleys are respectively connected to an end of the first drive shaft and the second drive shaft, and a belt extends over and interconnects the pulleys.

* * * * *